US007277799B2

(12) United States Patent
Park

(10) Patent No.: US 7,277,799 B2
(45) Date of Patent: Oct. 2, 2007

(54) ISOTOPE CORRELATION FILTER FOR MASS SPECTROMETRY

(75) Inventor: Melvin A. Park, Billerica, MA (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 11/055,530

(22) Filed: Feb. 9, 2005

(65) Prior Publication Data

US 2006/0195271 A1 Aug. 31, 2006

(51) Int. Cl.
*G06F 19/00* (2006.01)
*H01J 49/26* (2006.01)

(52) U.S. Cl. ............................ 702/23; 702/27; 702/31; 250/281; 250/282; 250/286; 250/287; 250/423 R

(58) Field of Classification Search .................. 702/23, 702/31, 27; 250/282, 287, 281, 286, 423 R
See application file for complete search history.

(56) References Cited

U.S. PATENT DOCUMENTS 4,583,183 A * 4/1986 Winiecki et al. .............. 702/31
5,367,162 A * 11/1994 Holland et al. ............. 250/287
6,188,064 B1 2/2001 Koster
6,288,389 B1 * 9/2001 Franzen ...................... 250/282

OTHER PUBLICATIONS

S. Bialkowski, "Real Time Digital Filters: Finite Impulse-Response Filters," Analytical Chemistry, 1988, 60:355A.

V. Andreev, "A Universal Denoising and Peak Picking Algorithm for LC-MS Based on Matched Filtration in the Chromatographic Time Domain," Analytical Chemistry, 2003, 75: 6314.

* cited by examiner

*Primary Examiner*—John Barlow
*Assistant Examiner*—Hien Vo
(74) *Attorney, Agent, or Firm*—Ward & Olivo

(57) ABSTRACT

The present invention relates generally to mass spectrometry and the analysis of chemical samples, and more particularly to methods for processing data obtained therefrom. Disclosed is an improved method for filtering low intensity mass spectral data. More specifically, the invention provides a method for use with digitized mass spectra that facilitates the distinction between low level signals and noise using the correlation of signals therein based on their mass differences.

14 Claims, 4 Drawing Sheets

ISOTOPE CORRELATION FILTER FOR MASS SPECTROMETRY

TECHNICAL FIELD OF THE INVENTION

The present invention generally relates to an improved method and apparatus for the processing of mass spectral data. Specifically, the invention relates to a method for use with digitized mass spectra that facilitates the distinction of low level signals from noise. A preferred embodiment of the present invention allows for the filtering of mass spectral data by the correlation of signals in spectra based on mass differences.

BACKGROUND

This invention relates in general to ion beam handling in mass spectrometers and more particularly to a means of accelerating ions in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers. TOF mass analyzers are of particular importance with respect to the invention disclosed herein. While each mass spectrometric method has a unique set of attributes. Thus, TOFMS is one mass spectrometric method that arose out of the evolution of the larger field of mass spectrometry. The analysis of ions by TOFMS, as the name suggests, is based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications. TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet is timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation (CID). Such collisions can be carried out at high (5-10 keV) or low (10-100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis. In a TOFMS instrument, molecular and fragment ions formed in the source are accelerated to a kinetic energy:

$$eV=1/2mv^2 \quad (1)$$

where e is the elemental charge, V is the potential across the source/accelerating region, m is the ion mass, and v is the ion velocity. These ions pass through a field-free drift region of length L with velocities given by equation (1). The time required for a particular ion to traverse the drift region is directly proportional to the square root of the mass/charge ratio:

$$t=L(m/2\ eV)^{0.5} \quad (2)$$

Conversely, the mass/charge ratios of ions can be determined from their flight times according to the equation:

$$m/e=at^2+b \quad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1-5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 kev). A short time-delay (1-7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VaiBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1-5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999-1002.; Olthoff, J. K.; Cotter, R. J., Nucl. Instrum. Meth. Phys. Res. B-26 (1987) 566-570. In both of these instruments, the time delay range between ion formation and extraction was; extended to 5-50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to the ions' final kinetic energy. Plasma desorption mass spectrometers have been constructed at Rockefeller (Chait, B. T., Field, F. H., J. Amer. Chem. Soc. 106 (1984) 1.93), Orsay (LeBeyec, Y.; Della Negra; S.;. Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has been commercialized by BIO-ION Nordic (Upsalla, Sweden). Plasma desorption utilizes primary ion particles with kinetic energies in the MeV range to induce desorption/ionization. A similar instrument was constructed at Manitoba (Chain, B. T.; Standing, K. G., Int. J. Mass Spectrum. Ion Phys. 40 (1981) 185) using primary ions in the keV range, but has not been commercialized.

Matrix-assisted laser desorption (MALD), introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights. That is, there is no additional focusing after the ions are accelerated and allowed to enter the drift region. Two approaches to additional energy focusing have been utilized, those which pass the ion beam through an electrostatic energy filter.

The reflectron (or ion mirror) was first described by Mamyrin (Mamyrin, B. A.; Karatajev. V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA, (LAser Microprobe Mass Analyzer). A similar instrument was also commercialized by Cambridge Instruments as the Laser Ionization Mass Analyzer (LIMA). Benninghoven (Benninghoven reflection) has described a secondary ion mass spectrometer (SIMS) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., Ion Formation from Organic Solids IFOS III, ed. by A. Benninghoven, pp 42-45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wolinik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the "ETOF" was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42-45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instrument. In both instruments, MS/MS information is obtained at the expense of high resolution. In addition correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325-326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization (ESI). For more detailed structural analysis, proteins are generally cleaved chemically using CNBr or enzymatically using trypsinor other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ions, but not in producing fragmentation. In a tandem instrument the first mass analyzer passes molecular ions corresponding to the peptide of interest. These ions are activated toward fragmentation in a collision chamber, and their fragmentation products are extracted and focused into the second mass analyzer which records a fragment ion (or daughter ion) spectrum.

A tandem TOFMS consists of two TOF analysis regions with an ion gate between the two regions. The ion gate allows one to gate (i.e., select) ions which will be passed from the first TOF analysis region to the second. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate is only opened at the arrival time of the ion mass of interest, then only ions of that mass-to-charge will be passed into the second TOF: analysis region.

However, it should be noted that the products of an ion dissociation that occur after the acceleration of the ion to its final potential will have the same velocity as the original ion. The product ions will therefore arrive at the ion gate at the same time as the original ion and will be passed by the gate (or not) just as the original ion would have been.

The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

In all types of modern mass spectrometers, signals generated by the mass analyzer are digitized by analog-to-digital converters and recorded as data files via computers. These mass spectral data consists of a linear array of data points which can be plotted as signal intensity versus mass.

It is often desirable to detect the smallest amount of sample material possible. Also, in many cases, it is desirable to obtain many spectra in as short a time as possible—for example, to monitor changing conditions in the sample or to monitor the effluent from a chromatographic column. As instruments become ever faster, the number of ions in the spectrum can become relatively small such that most data points in the mass spectrum have no signal—i.e., they have an intensity of zero.

In a TOF mass spectrometer, for example, the signal is the result of the impact of ions on a detector. Often, ions strike the detector individually. Thus, in sufficiently short duration experiments, or when the ion beam current is sufficiently low individual ions are recorded in the mass spectrum. That is, many of the signals observed in a mass spectrum represent one or only a few ions. Given the small number of ions in such data sets, it no longer makes sense to discuss certain statistical measures. For example, signal-to-noise is not a valid measure when most of the data points in the spectrum have an intensity value of zero. Calculating signal-to-noise ratios and trying to distinguish between signal and noise by statistical method is not useful in such situations.

Rather, other approaches should be used to distinguish useful information from background. One such approach is digital filtering. As described by S. Bialkowski (S. Bialkowski, Anal. Chem. 60(5) 355A(1988)), "In a broad sense, a filter is a process that can reduce the quantity of information, thereby translating it into a simpler, more interpretable form. In otherwords, the digital filter can extract the important information from a complex signal."

Many methods of processing mass spectral data have been developed over the years. For example, V. Andreev et al. (V. P. Andreev et al., Anal. Chem. 75, 6314(2003)) developed an algorithm for "matched filtration" of liquid chromatography—mass spectrometry (LC-MS) data. In other work, C. Koster (Koster, U.S. Pat. No. 6,188,064) developed an algorithm that fits a group of peaks based on an expected isotope distribution given an approximate mass and class of compound. In yet another work, J. Franzen (Franzen, U.S. Pat. No. 6,288,389) describes a method for the rapid evaluation of mass spectral data based on the "weighted summation" of data which improves its signal-to-noise ratio.

However, none of these prior art methods address filtering of individual mass spectra having low levels of signals. As discussed above, when the signal level is sufficiently low, the application of statistical measures and methods is not useful. As discussed below, the isotope correlation filter according to the present invention overcomes these prior art limitations to address the processing of mass spectra having low signal levels.

SUMMARY OF THE INVENTION

The present invention relates generally to mass spectrometry and the analysis of chemical samples, and more particularly to methods for processing data therefrom. The invention described herein comprises an improved method for filtering low intensity mass spectral data. More specifically, the present invention provides a method for use with digitized mass spectra that facilitates the distinction of low level signal from noise by the correlation of signals therein based on their mass differences.

In light of the above described inadequacies in the prior art, a primary aspect of the present invention is to provide a means of filtering a mass spectrum having low signal intensity. The initial assumption is that signals consisting of single ions are not useful. However, if such a signal can be correlated with one or more other signals in the spectrum, it is much more likely that it is real and potentially useful. One easy correlation is between isotopes. If a given signal consists of a single ion, then it may simply be background. If there is also an isotope ion in the spectrum, then the probability that these two ions are of analytical significance is greatly increased.

Thus, the filter algorithm according to the present invention correlates signals with signals of one atomic mass: unit (amu) higher or lower m/z. There is, of course, the implicit assumption that any two signals one amu apart are, in fact, isotopes of one another. Importantly, this filter does not correlate peaks with each other—rather the correlation is made point-by-point. Initially a threshold is applied to the spectrum. Typically, the threshold is set between the level of electronic noise and the level of a single ion event. Only data points above this threshold are considered signals. For each data point above the threshold, the data points corresponding to one amu higher or lower m/z are calculated from the calibration constants. If there is a signal above the threshold in one of these data points then the value of the data point under consideration is retained. Otherwise its value is set to the level of the background.

Therefore, it is an object of the present invention to provide a method and apparatus for processing mass spectra with low signal levels.

It is another object of the present invention to facilitate the distinction of low level signal from noise in digitized mass spectra by correlating signals based on their mass differences.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE FIGURES

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
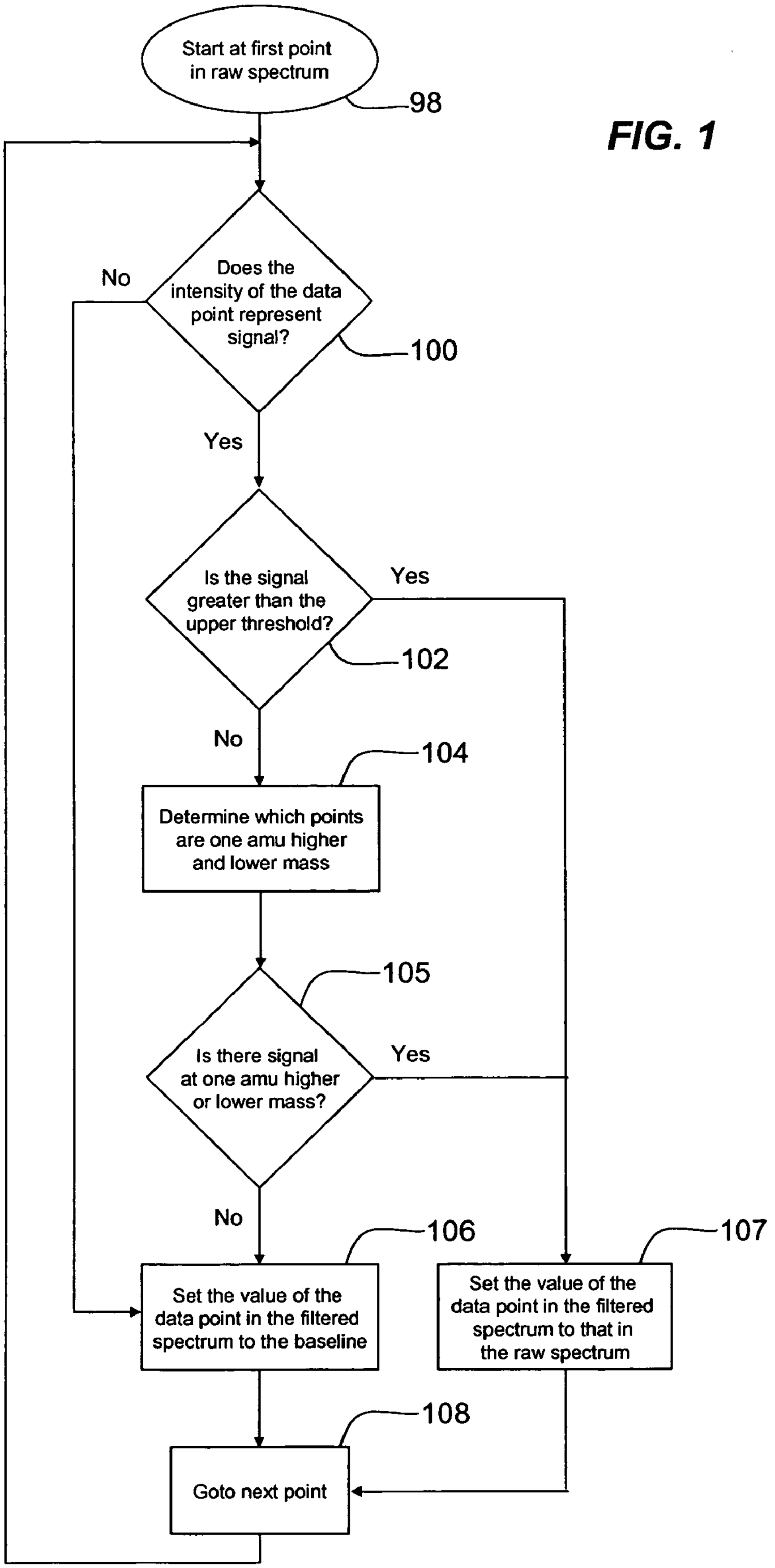
FIG. 1 is a flow chart of the isotope correlation filter method according to the preferred embodiment of the present invention.

Referring first to FIG. 1, a flow chart for the isotope correlation filter algorithm is depicted. In the preferred embodiment, this filter algorithm is applied to a data set after acquisition is complete. However, in alternate embodiments, the algorithm may be applied during the course of the acquisition of a data set. The steps depicted in the flow chart are preferably applied at each individual data point in the mass spectra data set. For example, the analysis of the data set begins with the "first"—.e.g., lowest mass—data point (step 98) and proceeds point-by-point to the "last"—e.g., highest mass—data point.

As shown in FIG. 1, in the analysis of each data point according to the preferred embodiment, the data point is first analyzed to determine if a signal is present (step 100). For example, a signal may be considered to be present if the intensity is above a certain lower threshold. That is, for example, the detection of a single ion may result in a signal intensity of 10 to 20 counts on an arbitrary scale. The lower threshold might then be set to 5 counts. Data points having a value above 5 counts would be considered to be signals whereas those below 5 counts would be considered to be noise. In alternate embodiments, any method might be applied to determine if a signal is present. If it is determined that a signal is not present then the algorithm proceeds to set the value of the corresponding data point in the filtered spectrum is set to the value of the baseline (step 106). The algorithm then proceeds to the next data point (step 108), which is then analyzed to determine if a signal is present (step 100). However, if a signal is found to be present (step 100), then the algorithm proceeds to determines if the signal is strong enough that it should not be considered, in any case, to be "noise" (step 102). In the preferred embodiment, this is determined by comparison to an "upper threshold". For example, if, as mentioned above, it is assumed that a single ion results in a signal intensity of 10 to 20 counts then about 3 to 5 ions are represented by the signal in a data point of 50 counts. Therefore, if one considers 3 to 5 ions to be a definitive signal then one would set the upper threshold to 50 counts, and signals above this threshold would be retained. In alternate embodiments, any method might be applied to determine if the signal should be retained. If it is determined that the signal should be retained the algorithm sets the value of the corresponding data point in the filtered spectrum to the value of the data point under consideration in the raw spectrum (step 107) and then proceeds the next data point (step 108), which is then analyzed (step 100).

If a signal is determined to be present (step 100), but is not strong enough to be considered a definitive signal (step 102) then the algorithm proceeds to detect the presence of a signal in data points of one amu higher or lower mass than the data point under consideration (step 104).

Often the raw data used to construct a mass spectrum does not take the form of signal versus mass but rather signal versus some other parameter. For example, in a time-of-flight (TOF) mass spectrometer the raw data is obtained as signal versus the flight time of ions from a starting location to an ending location. The flight time is then related to the ion mass by a calibration function—i.e. longer flight time indicates higher mass. In a TOF mass spectrometer the flight time is a linear function of the square root of the ion mass. Similarly, in a Fourier transform ion cyclotron resonance (FTICR) mass spectrometer, the data is obtained essentially in the form of signal intensity vs cyclotron frequency and the frequency is then related to ion mass by a calibration function. Thus, in the preferred embodiment, a calibration function is used to determine the data points most closely corresponding to one amu higher or lower mass relative to the data point under consideration (step 104).

Once these closely corresponding data points are determined, the algorithm then determines if the data points of one amu higher or lower mass represent signals (step 105). As discussed above, if the intensity of the data point is above a threshold then it is considered to be a signal. The value of the threshold may be the same as or different than the previous threshold. In alternate embodiments, any known method of distinguishing signal from noise might be used. For example, the intensity of the data points may be compared to a mean intensity value of all other points in the spectrum. If it is found that the points are three standard deviations above the mean then they may be considered to be signals. If it is found that either of these data points represents a signal, then the algorithm sets the value of the corresponding data point in the filtered spectrum to the value of the data point under consideration in the raw spectrum (step 107) and then proceeds to the next data point (step 108), which is analyzed (step 100).

Finally, if neither the data point at one amu higher mass or the data point at one amu lower mass represents a signal, then the algorithm proceeds to set the intensity of the corresponding data point in the filtered spectrum to the level of the baseline (step 106). Any known method of approximating the value of the baseline might be used. For example, the baseline may be taken to be the average value of data points throughout the raw spectrum. Alternatively, the standard deviation of the intensities of the points in the data set may be calculated. The value of the baseline may be taken to be the average intensity of those points within one standard deviation of the mean.

It should be clear that unlike many prior art algorithms, the algorithm of the present invention does not rely on the recognition of mass spectral peaks or on fitting peaks or patterns of peaks. Such prior art algorithms require a "statistically significant" number of ions to produce the desired result. That is, there must be enough ions in the peak or set of peaks to produce a peak or set of peaks having the expected peak shape and/or isotope distribution.

It would be apparent to one of ordinary skill in the art, slightly different steps might be applied in the analysis. For example, in alternate embodiments, the algorithm may in step 104 correlate the signal in question with signals at +/−22 amu corresponding to sodium adduction. Alternatively, correlations with other adduct species such as potassium, water, methanol, or any other species of interest may be made. Further embodiments may correlate the signal in question with peaks fractions of amu distant. For example, it may be assumed that the ions are doubly charged and that therefore the isotopes will appear at +/−½ amu from the signal in question. Also, some of the steps might be eliminated in alternate embodiments.

Figures 2A, 2B:
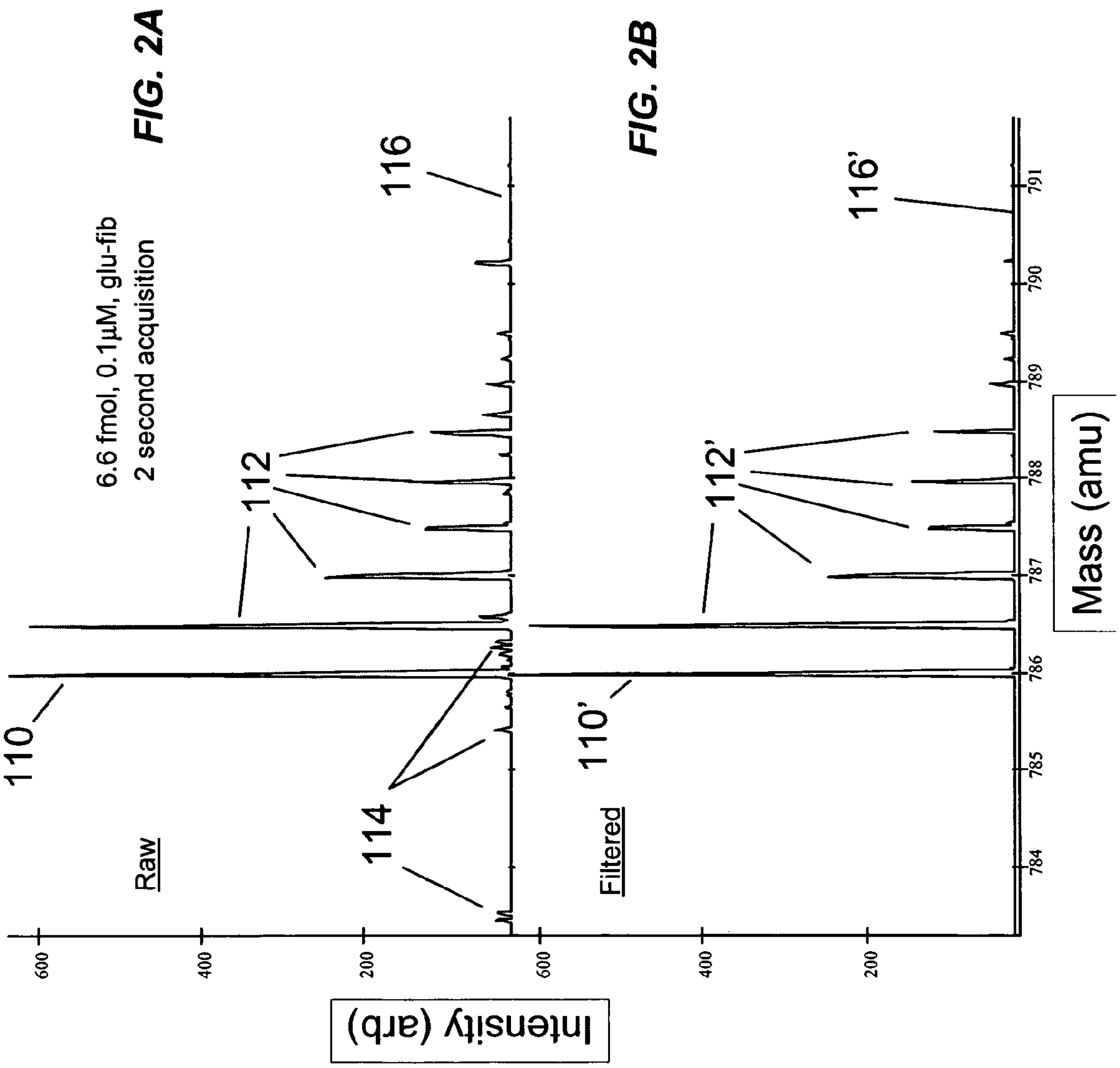
FIG. 2A shows a raw spectrum of data accumulated for glu-fibrinopeptide from a mass spectrometric analysis in two (2) seconds.
FIG. 2B is the glu-fibrinopeptide spectrum of FIG. 2A filtered according to steps 104-108 of the isotope correlation filter method shown in FIG. 1.

Referring next to FIGS. 2A and 2B, examples of raw and filtered data of glu-fibrinopeptide are shown. These data were obtained in the course of the analysis of glu-fibrinopeptide using ultrOTOF™ mass spectrometer (Bruker Daltonics, Billerica, Mass.). The ultrOTOF™ is an electrospray ionization orthogonal TOF mass spectrometer. Referring to FIG. 2A, the data was obtained by spraying a 0.1 mM glu-fibrinopeptide in 50:50 methanol:water and 0.1% formic acid. The data was accumulated for a total of two seconds and the threshold on the digitizer was set such that electronic noise was not recorded. The ion current was sufficiently low and the experiment was sufficiently short that most of the data points had an intensity of zero. As a result, baseline 116 was zero. Signals corresponding to individual ions 114 can be observed above baseline 116, while peak 110 corresponds to the doubly charged monoisotopic ion of glu-fibrinopeptide. Peaks 112 correspond to doubly charged isotope ions of glu-fibrinopeptide.

Referring to FIG. 2B, the data set of FIG. 2A is shown after filtering according to the method of FIG. 1. In this example, the raw data shown in FIG. 2A was filtered according to steps 104-108 of the isotope correlation filter algorithm described with respect to FIG. 1. Steps 100 and 102 were not used—i.e. the presence of a signal in the data point was not considered, and the intensity of that signal was not considered. The threshold used to determine the presence of a signal was set to 5 counts. As seen in FIG. 2B, baseline 116' in the filtered spectrum is identical to baseline 116 in the raw spectrum of FIG. 2A. Similarly, monoisotopic peak 110' and isotopic peaks 112' in the filtered spectrum of FIG. 2B are preserved without modification from the raw spectrum. However, signals 114 corresponding to individual, uncorrelated ions, have been eliminated from the spectrum of FIG. 2B.

Figures 3A, 3B:
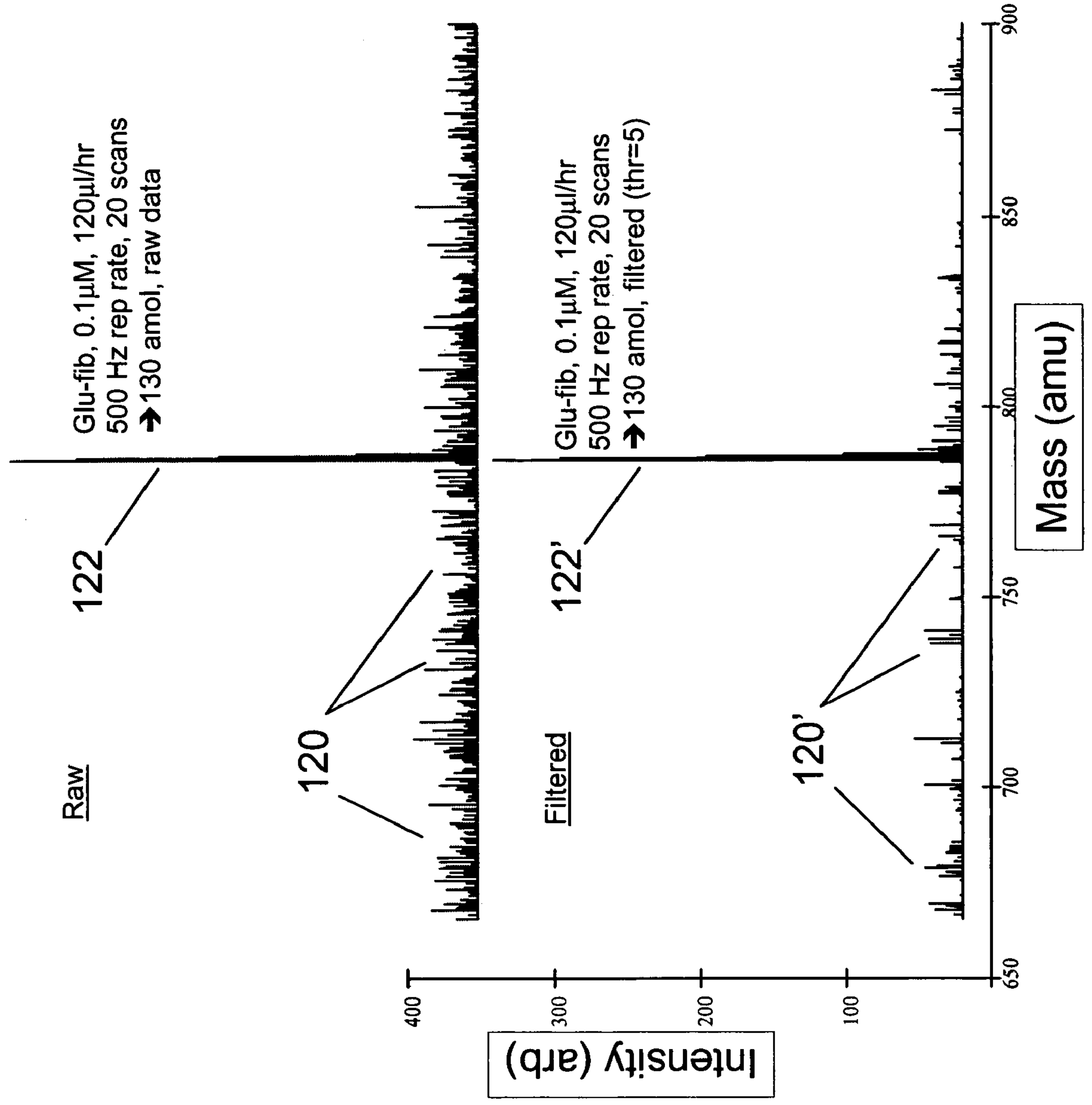
FIG. 3A shows a raw spectrum of data accumulated for glu-fibrinopeptide from a mass spectrometric analysis of forty (40) milliseconds.
FIG. 3B is the glu-fibrinopeptide spectrum of FIG. 3A filtered according to steps 104-108 of the isotope correlation filter method shown in FIG. 1.

Referring next to FIGS. 3A and 3B, shown is another example using an ultrOTOF™ mass spectrometer and the filter according to the present invention to analyze a glu-fibrinopeptide sample. The glu-fibrinopeptide sample was prepared and analyzed in the same as discussed with respect to FIGS. 2A and 2B except that the signal was accumulated for only 40 milliseconds. The raw spectrum shown in FIG. 3A consists of peaks 122 associated with glu-fibrinopeptide ions and "background" ions 120. As in the case of FIGS. 2A and 2B, the baseline is zero counts.

The spectrum of FIG. 3B is the data set of FIG. 3A after filtering. As discussed above with reference to FIGS. 2A and 2B, the raw data shown in FIG. 3A was filtered according to steps 104-108 of the isotope correlation filter algorithm described with respect to FIG. 1. The threshold used to determine the presence of signal was set to 5 counts. As seen in FIG. 3B, much of the signal corresponding to "background" ions 120 have been filtered away. However, glu-fibrinopeptide peaks 122 are preserved without substantial modification as peaks 122' in the filtered spectrum. Correlated background ions 120' appear in the filtered spectrum. These are preserved in the filtered spectrum because they are correlated with isotope signals of one amu greater or lesser mass.

Referring back to FIGS. 2A and 2B, it is interesting to note that peaks 110 and 112 appear at half amu intervals—as opposed to one amu intervals. This is because the ions are doubly charged. While the actual molecular weight of glu-fibrinopeptide is 1570.6, because the mass analyzer actually measures the mass-to-charge (m/z) ratio—as opposed to mass—ions that are doubly charged appear at about half their actual molecular weight (in this case 786 amu). For the same reason, peaks 110 and 112 appear at half amu intervals.

The algorithm of the present invention as discussed with respect to FIG. 1 works even though the ions are doubly charged. The electrospray method of forming analyte ions can, of course, result in multiply charged ions. Generally, more highly charged ions will be of higher molecular weight and will therefore have more isotope peaks. That is, while an ion might be, for example, quadruply charged, it is likely to be of high enough molecular weight to have a substantial isotope, four amu greater than the monoisotopic mass. Considering that the ions are quadruply charged the isotope which is actually four amu greater in mass will appear just one amu higher in mass-to-charge. The algorithm would thus correlate the monoisotopic peak with the isotope of four amu greater mass. Thus, generally, the algorithm will be unaffected by the charge state of the ion. Notice, there is no issue when using ion formation methods which result in only singly charged ions. Such methods include, for example, matrix assisted laser desorption ionization (MALDI), atmospheric pressure chemical ionization (APCI), chemical ionization (CI), electron ionization (EI), and secondary ionization (SIMS).

Figures 4A, 4B:
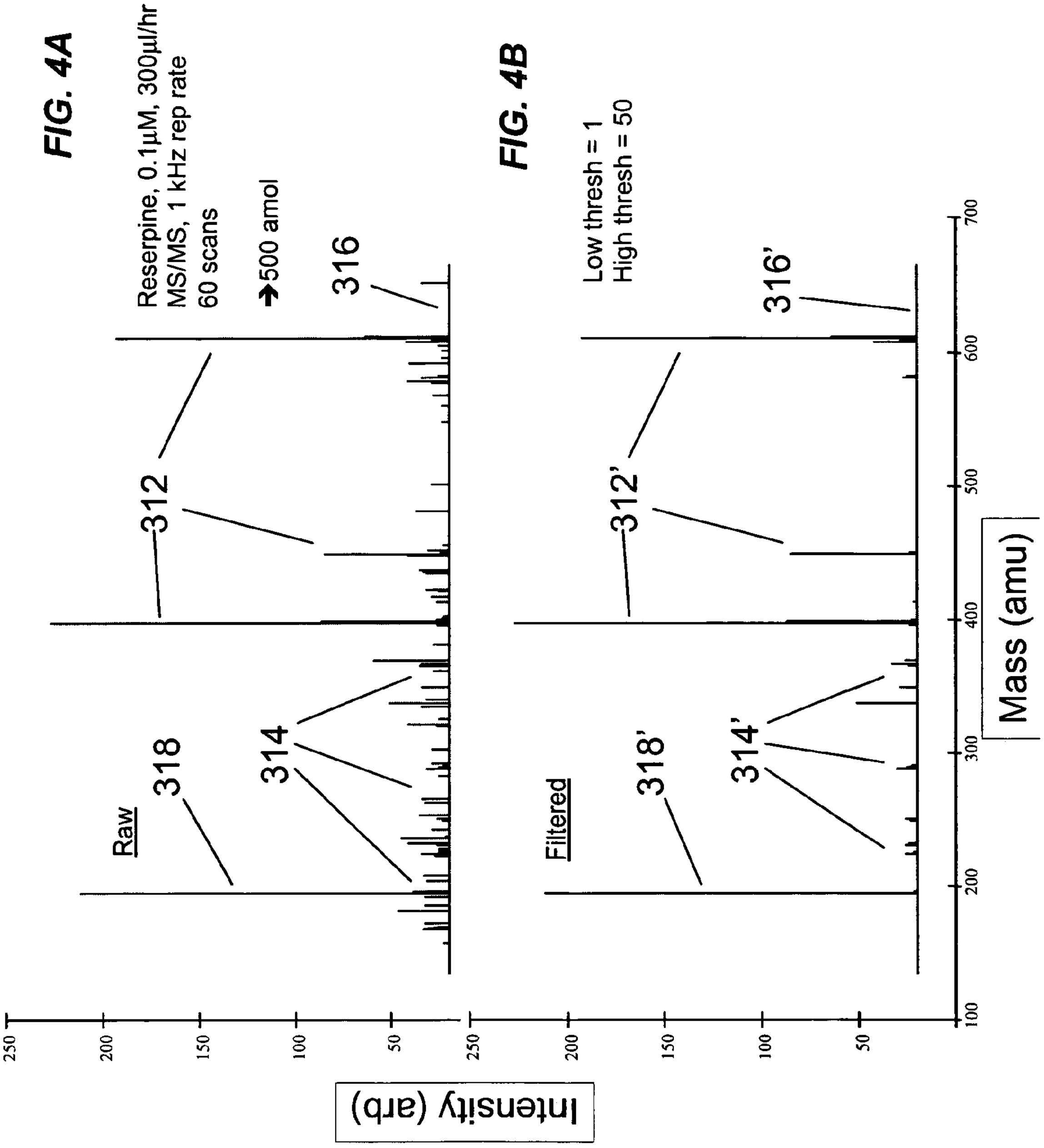
FIG. 4A is a raw fragment ion spectrum of data accumulated for reserpine in sixty (60) milliseconds.
FIG. 4B is the reserpine fragment ion spectrum of FIG. 4A filtered according to the isotope correlation filter method as shown FIG. 1.

However, for the same reasons using the "truncated" filter as discussed with respect to FIGS. 2A, 2B, 3A and 3B will favor higher molecular weight (MW) species. That is, low MW species will naturally have fewer isotope peaks and fewer ions in these peaks. The probability of finding isotope ions—and retaining an otherwise valid signal—is thus reduced at low m/z. Referring now to FIGS. 4A and 4B; shown is data resulting from the analysis of a sample of reserpine with an ultrOTOF™. The concentration of reserpine was 0.1 μM in 50:50 methanol:water with no acid. The reserpine solution was electrosprayed using a pneumatic sprayer at a rate of 5 μL/min. Fragment ions were generated by collision induced dissociation. These were then mass analyzed to produce the spectrum shown. The raw spectrum of FIG. 4A was accumulated in 60 milliseconds.

The raw spectrum shown in FIG. 4A consists of fragment ion peaks 312 associated with reserpine and "background" ions 314. In the cases of FIGS. 4A and 4B, the baseline 316 is zero counts. The spectrum of FIG. 4B is the data set of FIG. 4A after filtering. Unlike the data sets of FIGS. 2A, 2B, 3A and 3B, the raw data shown in FIG. 4A was filtered according to the complete isotope correlation filter algorithm described with respect to FIG. 1, including steps 100 and 102. The threshold used to determine the presence of signal was set to 5 counts. The upper threshold for step 102 was set to 50 counts. As seen in FIG. 4B, much of the signal corresponding to "background" ions 314 have been filtered away. However, fragment ion peaks 312 are preserved without substantial modification as peaks 312' in the filtered spectrum in FIG. 4B. Importantly, correlated background ions 314' appear in the filtered spectrum, as they are preserved because they are correlated with isotope signals of one amu greater or lesser mass.

Importantly, peak 318 which appears at m/z 195 amu in the raw spectrum of FIG. 4A is preserved as peak 318' in the filtered spectrum of FIG. 4B. Because peak 318 corresponds to a low molecular weight species, and because the statistics—i.e., the number of ions in the spectrum—are so low, no corresponding isotope peak appears in the spectrum. As a result, if only steps 104-108 were used to filter the data, peak 318' would not appear in the filtered spectrum. However, peak 318 has an intensity greater than the threshold used in step 102. As a result, even though peak 318 has no isotope in the spectrum, it is nonetheless retained as peak 318'.

While the present invention has been described with reference to one or more preferred and alternate embodiments, such embodiments ate merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method of providing a filtered mass spectrum from a mass spectrum of raw data, said method comprising the steps of:

a) identifying a first data point in a mass spectrum of raw data;

b) determining if said first data point represents a signal;

c) identifying a second and third data point in said raw data, said second data point having a predetermined greater mass than said first data point and said third data point having a predetermined lesser mass than said first data point;

d) determining if said second or third data points represent signals;

e) setting a data point in a filtered mass spectrum corresponding to said first data point to the value of said first data point if either the second or third data points represent signals;

f) repeating steps a) through e) for every data point in said mass spectrum of raw data; and g) outputting the filtered data points as a filtered mass spectrum.

2. A method according to claim 1, wherein said identifying said second and third data points is performed using a calibration function.

3. A method according to claim 1, wherein the step of setting a data point further comprises comparing the intensity value of said second and third data points to a threshold value to determine if said second or third data points represent signal.

4. A method according to claim 1, wherein said predetermined greater or lesser mass is one atomic mass unit (amu).

5. A method according to claim 1, wherein said predetermined greater or lesser mass is a fraction of one amu.

6. A method according to claim 1, said method further comprising the steps of:

$a^{i}$) determining if said first data point represents a signal; and $a^{ii}$) setting a value of a data point in said filtered mass spectrum corresponding to said first data point to a baseline value and skipping steps b), c), and d) if said first data point does not represent signal.

7. A method of providing a filtered mass spectrum from a mass spectrum of raw data, said method comprising the steps of:

a) identifying a first data point in a mass spectrum of raw data;

b) determining if said first data point represents a signal;

c) determining if an intensity of said first data point exceeds a predetermined threshold;

d) setting a value of a data point in a filtered mass spectrum corresponding to said first data point to a value of said first data point if said first data point exceeds said predetermined threshold;

e) repeating steps a) through d) for every data point in said mass spectrum of raw data; and f) outputting the filtered data points as a filtered mass spectrum.

8. A method according to claim 7, wherein said predetermined threshold is used to determine if said first data point is of analytical significance.

9. A method of providing a filtered mass spectrum from a mass spectrum of raw data, said method comprising the steps of:

a) identifying a first data point in a mass spectrum of raw data;

b) determining a baseline value to be an average intensity of data points in said mass spectrum of raw data having an intensity within one standard deviation of a mean intensity of all data points in said mass spectrum of raw data;

c) determining if said first data point represents a signal;

d) identifying a second and third data point in said raw data, said second data point having a predetermined greater mass than said first data point and said third data point having a predetermined lesser mass than said first data point;

e) determining if said second or third data points represent signals;

f) setting a data point in a filtered mass spectrum corresponding to said first data point to the value of said first data point if either the second or third data points represent signals;

g) repeating steps a) through f) for every data point in said mass spectrum of raw data; and h) outputting the filtered data points as a filtered mass spectrum.

10. A method according to claim 9, wherein said identifying said second and third data points is performed using a calibration function.

11. A method according to claim 9, wherein the step of setting a data point further comprises comparing the intensity value of said second and third data points to a threshold value to determine if said second or third data points represent signal.

12. A method according to claim 9, wherein said predetermined greater or lesser mass is one atomic mass unit (amu).

13. A method according to claim 9, wherein said predetermined greater or lesser mass is a fraction of one amu.

14. A method according to claim 9, said method further comprising the steps of:

$a^{i}$) determining if said first data point represents a signal; and $a^{ii}$) setting a value of a data point in said filtered mass spectrum corresponding to said first data point to a baseline value and skipping steps b), c), and d) if said first data point does not represent signal.

* * * * *